United States Patent
Bakshi et al.

(10) Patent No.: US 8,570,853 B2
(45) Date of Patent: Oct. 29, 2013

(54) SYSTEMS, METHODS, APPARATUS AND COMPUTER PROGRAM PRODUCTS FOR NETWORKING TRADING TURRET SYSTEMS USING SIP

(75) Inventors: Aseem Bakshi, Stamford, CT (US); Daniel R. Elliott, Southbury, CT (US); Rajnish Jain, Fairfield, CT (US); Timothy Potts, East Haven, CT (US); Elias Koutikas, Seymour, CT (US)

(73) Assignee: IPC Systems, Inc., Jersey City, NJ (US)

( * ) Notice: Subject to any disclaimer, the term of this patent is extended or adjusted under 35 U.S.C. 154(b) by 1179 days.

(21) Appl. No.: 12/172,545

(22) Filed: Jul. 14, 2008

(65) Prior Publication Data
US 2009/0022145 A1    Jan. 22, 2009

Related U.S. Application Data

(60) Provisional application No. 60/970,077, filed on Sep. 5, 2007, provisional application No. 60/950,934, filed on Jul. 20, 2007.

(51) Int. Cl.
*G06F 11/00*    (2006.01)

(52) U.S. Cl.
USPC ............ 370/216; 370/242; 370/254; 370/352

(58) Field of Classification Search
None
See application file for complete search history.

(56) References Cited

U.S. PATENT DOCUMENTS

| | | | |
|---|---|---|---|
| 5,623,489 A * | 4/1997 | Cotton et al. ................. | 370/381 |
| 6,212,177 B1 * | 4/2001 | Greene et al. ................. | 370/352 |
| 8,290,138 B2 * | 10/2012 | Bakshi et al. ................. | 379/229 |
| 2006/0072469 A1 * | 4/2006 | Tazaki ........................... | 370/242 |
| 2006/0165067 A1 * | 7/2006 | Kitazawa ...................... | 370/352 |
| 2006/0274660 A1 * | 12/2006 | Da Palma et al. ............. | 370/241 |
| 2007/0153770 A1 * | 7/2007 | Goyal et al. ................... | 370/352 |
| 2007/0165811 A1 * | 7/2007 | Reumann et al. ........ | 379/201.01 |
| 2008/0044032 A1 * | 2/2008 | Lou et al. ...................... | 380/284 |
| 2008/0130487 A1 * | 6/2008 | Hoffmann ..................... | 370/216 |
| 2009/0022299 A1 * | 1/2009 | Bakshi et al. ............ | 379/220.01 |

OTHER PUBLICATIONS

"IPC Customer Success: RTI selected for VoIP IQMX Turret Design", 2006, Real-Time Innovations, Inc., pp. 1-2.*
A No Soliciting Simple Mail Transfer Protocol (SMTP) Service Extension, RFC 3865, Sep. 2004.
A Message Summary and Message Waiting Indication Event Package for the Session Initiation Protocol (SIP), RFC 3842, Aug. 2004.
A Presence Event Package for the Session Initiation Protocol (SIP), RFC 3856, Aug. 2004.
Session Initiation Protocol (SIP)—Specific Event Notification, RFC 3265, Jun. 2002.
The Session Initiation Protocol (SIP) Update Method, RFC 3311, Sep. 2002.
An Invite-Initiated Dialog Event Package for the Session Initiation Protocol (SIP), RFC 4235, Nov. 2005.

(Continued)

*Primary Examiner* — Andrew Chriss
*Assistant Examiner* — Salvador E Rivas
(74) *Attorney, Agent, or Firm* — Fitzpatrick, Cella, Harper & Scinto

(57) ABSTRACT

Systems, methods, apparatus and computer program products are provided for sharing a resource including a subscription engine configured to subscribe to a first turret system to share the resource, a state change engine configured to receive a state change notification corresponding to the resource, from the turret system, and a failover engine configured to invite the turret system to initiate a connection to the resource.

20 Claims, 11 Drawing Sheets

(56) References Cited

OTHER PUBLICATIONS

SIP: Session Initiation Protocol, RFC 3261, Jun. 2002.
Enterprise SIP Server Release 1.0, Administration Guide, Revision A.
Enterprise SIP Server Release 1.0, Installation & Maintenance Manual, Revision B.
Alliance MX 12.1, Release Notes, Feb. 2006.
Alliance MX Release 12.1, Switching Center Cards Handbook, Dec. 2005.

* cited by examiner

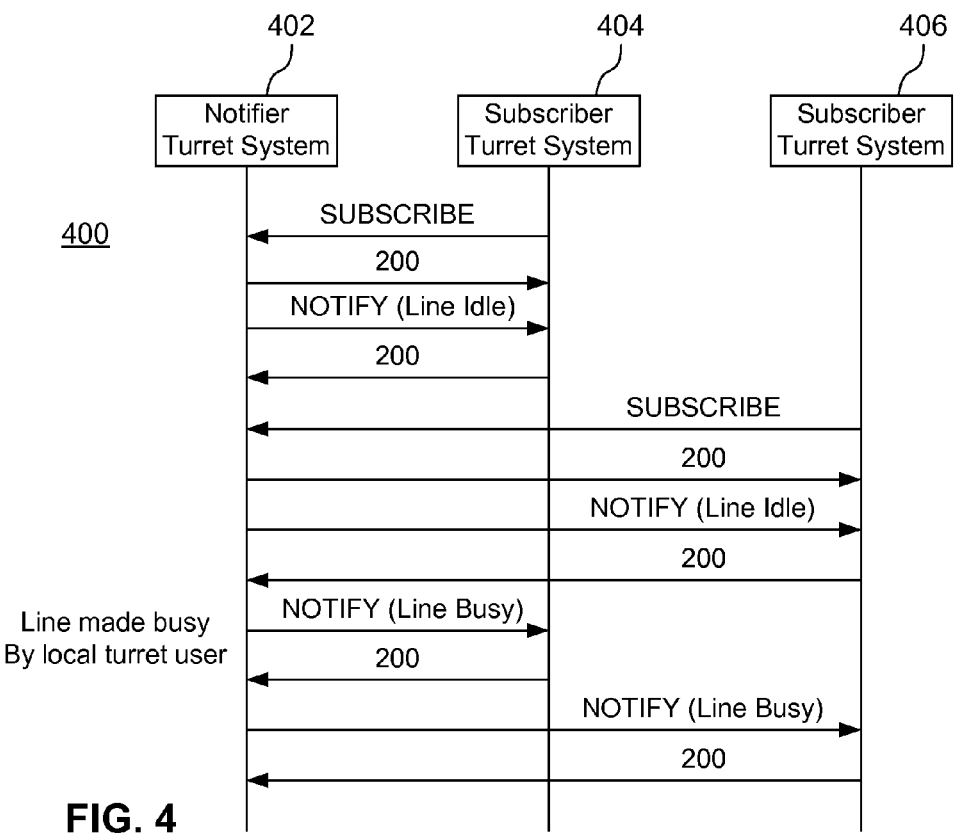

FIG. 4

```
SUBSCRIBE sip:201401145@159.63.78.235:5060 SIP/2.0
From: <sip:201401145@159.63.77.95:5072>;tag=b58c0668-5f4d3f9f-13d0-45026-195242-
2d2c8897-195242
To: <sip:201401145@159.63.77.95:5072>
Call-ID: b5811150-5f4d3f9f-13d0-45026-195242-4533f661-195242
Cseq: 1 SUBSCRIBE
Via: SIP/2.0/UDP 159.63.77.95:5072;branch=z9hG4bK-195242-62e95287-b2490d4
Expires: 3600
Accept: application/x-ipc-resource-status-info
Max-Forwards: 70
Event: x-ipc-resource-status
Contact: <sip:159.63.77.95:5072>
Content-Length: 0
```
⎫
⎬ 502
⎭

```
SIP/2.0 200 OK
From: <sip:201401145@159.63.77.95:5072>;tag=b58c0668-5f4d3f9f-13d0-45026-195242-
2d2c8897-195242
To: <sip:201401145@159.63.77.95:5072>;tag=e31978-0-13c4-45026-7f39f-6a17522d-7f39f
Call-ID: b5811150-5f4d3f9f-13d0-45026-195242-4533f661-195242
Cseq: 1 SUBSCRIBE
Expires: 600
Via: SIP/2.0/UDP 159.63.77.95:5072;branch=z9hG4bK-195242-62e95287-b2490d4
Supported: 100rel,timer,replaces,from-change
User-Agent: IPC SIP LC – 15.00.00a
Contact: <sip:201401145@159.63.78.235:5060>
Content-Length: 0
```
⎫
⎬ 504
⎭

FIG. 5A

```
NOTIFY sip:159.63.77.95:5072 SIP/2.0
From: <sip:201401145@159.63.77.95:5072>;tag=e31978-0-13c4-45026-7f39f-6a17522d-7f39f
To: <sip:201401145@159.63.77.95:5072>;tag=b58c0668-5f4d3f9f-13d0-45026-195242-
2d2c8897-195242
Call-ID: b5811150-5f4d3f9f-13d0-45026-195242-4533f661-195242
Cseq: 1 NOTIFY
Via: SIP/2.0/UDP 159.63.78.235:5060;branch=z9hG4bK-7f39f-1f0fa702-4908ee45
Subscription-State: active
Event: x-ipc-resource-status
Max-Forwards: 70
Supported: 100rel,timer,replaces,from-change
User-Agent: IPC SIP LC – 15.00.00a
Contact: <sip:201401145@159.63.78.235:5060>
Content-Type: application/x-ipc-resource-status-info
Content-Length:47
```
⎫
⎬ 506
⎭

```
Extn=201401145
Status=Idle
CallSrc=Ext
CLI=No
```
⎫
⎬ 508
⎭

```
SIP/2.0 200 OK
From: <sip:201401145@159.63.77.95:5072>;tag=e31978-0-13c4-45026-7f39f-6a17522d-7f39f
To: <sip:201401145@159.63.77.95:5072>;tag=b58c0668-5f4d3f9f-13d0-45026-195242-
2d2c8897-195242
Call-ID: b5811150-5f4d3f9f-13d0-45026-195242-4533f661-195242
Cseq: 1 NOTIFY
Via: SIP/2.0/UDP 159.63.78.235:5060>;branch=z9hG4bK-7f39f-1f0fa702-4908ee45
Contact: <sip:159.63.77.95:5072>
Content-Length: 0
```
⎫
⎬ 510
⎭

FIG. 5B

```
NOTIFY sip:159.63.77.95:5072 SIP/2.0
From: <sip:201401147@159.63.77.95:5072>;tag=e35050-0-13c4-45026-7f5f2-8d27404-7f5f2
To: <sip:201401147@159.63.77.95:5072>;tag=b58c0998-5f4d3f9f-13d0-45026-195495-
8040ce-195495
Call-ID: b5811500-5f4d3f9f-13d0-45026-195495-428fc928-195495
Cseq: 2 NOTIFY
Via: SIP/2.0/UDP 159.63.78.235:5060;branch=z9hG4bK-7f610-1f193137-4fd76558
Subscription-State: active
Event: x-ipc-resource-status
Max-Forwards: 70
Supported: 100rel,timer,replaces,from-change
User-Agent: IPC SIP LC – 15.00.00a
Contact: <sip:201401147@159.63.78.235:5060>
Content-Type: application/x-ipc-resource-status-info
Content-Length:47

Extn=201401145
Status=Busy
CallSrc=Ext
CLI=No
```
⎫
⎬ 512
⎭

```
SIP/2.0 200 OK
From: <sip:201401147@159.63.77.95:5072>;tag=e35050-0-13c4-45026-7f5f2-8d27404-7f5f2
To: <sip:201401147@159.63.77.95:5072>;tag=b58c0998-5f4d3f9f-13d0-45026-195495-
8040ce-195495
Call-ID: b5811500-5f4d3f9f-13d0-45026-195495-428fc928-195495
Cseq: 2 NOTIFY
Via: SIP/2.0/UDP 159.63.78.235:5060>;branch=z9hG4bK-7f610-1f193137-4fd76558
Contact: <sip:159.63.77.95:5072>
Content-Length: 0
```
⎫
⎬ 514
⎭

FIG. 5C

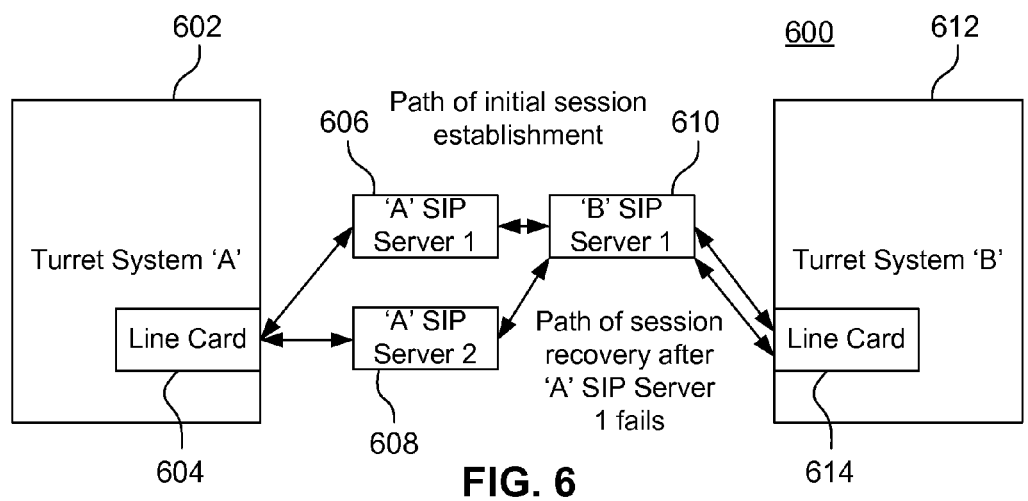

INVITE from Line Card to SIP Proxy Server

INVITE sip:bob@biloxi.com SIP/2.0
Via: SIP/2.0/UDP pc33.atlanta.com;branch=z9hG4bKnashds8
Max-Forwards: 70
To: Bob <sip:bob@biloxi.com>
From: Alice <sip:alice@atlanta.com>;tag=1928301774
Call-ID: a84b4c76e66710
Cseq: 314159 INVITE
Contact: <sip:alice@pc33.atlanta.com>
Content-Type: application/sdp
Content-Length: 142

} 1102

INVITE from SIP Proxy Server to Network Core Proxy Server

INVITE sip:bob@biloxi.com SIP/2.0
Via: SIP/2.0/UDP bigbox3.site3.atlanta.com;branch=z9hG4bK-4rft6ws-77ef4c23129983.1;
x-ipc-id=84d860e103f2ae19b32fc1f6942a8bc8
Via: SIP/2.0/UDP
Pc33.atlanta.com;branch=z9hG4bKnashds8;received=192.0.2.1
Max-Forwards: 69
To: Bob <sip:bob@biloxi.com>
From: Alice <sip:alice@atlanta.com>;tag=1928301774
Call-ID: a84b4c76e66710
Cseq: 314159 INVITE
Contact: <sip:alice@pc33.atlanta.com>
Content-Type: application/sdp
Content-Length: 142

} 1104

180 Ringing from Network Core Proxy Server to SIP proxy Server

SIP/2.0 180 Ringing
Via: SIP/2.0/UDP bigbox3.site3.atlanta.com;branch=z9hG4bK-4rft6ws-
77ef4c2312983.1;received=192.0.2.2
Via: SIP/2.0/UDP
Pc33.atlanta.com;branch=z9hG4bKnashds8;received=192.0.2.1
To: Bob <sip:bob@biloxi.com>;tag=a6c85cf
From: Alice <sip:alice@atlanta.com>;tag=1928301774
Record-Route: <sip: bigbox3.site3.atlanta.com>;
x-ipc-id=84d860e103f2ae19b32fc1f6942a8bc8
Call-ID: a84b4c76e66710
Contact: <sip:bob@192.0.2.4>
Cseq: 314159 INVITE
Content-Length: 0

SYSTEMS, METHODS, APPARATUS AND COMPUTER PROGRAM PRODUCTS FOR NETWORKING TRADING TURRET SYSTEMS USING SIP

CROSS REFERENCE TO RELATED APPLICATIONS

This application claims priority to, and the benefit of, U.S. Provisional Patent Application Ser. Nos. 60/970,077, filed Sep. 5, 2007, and 60/950,934, filed Jul. 20, 2007, both of which are hereby incorporated by reference in their entirety.

BACKGROUND

Field

The present invention generally relates to telecommunication systems, and more particularly to telephony switching systems.

A trading turret system is a specialized telephony switching system that allows a relatively small number of users to access a large number of external lines and provides enhanced communication features such as hoot-n-holler, push-to-talk, intercom, video and large-scale conferencing. These features are often utilized in the financial industry such as trading floor environments, as well as security/law enforcement, utilities, healthcare, and customer support (e.g., contact centers) environments.

Users interface with a trading turret system through a trading turret device, which is a phone-like desktop device with multiple handsets, speakers and buttons. A trading turret device is either implemented in dedicated hardware (sometimes referred to as a "hard" turret) or general-purpose computer (sometimes referred to as a "soft" turret). With the advent of Voice over Internet Protocol ("VoIP"), VoIP turret devices have moved from a fixed environment of dedicated voice communications trading resources to a more virtualized trading environment across multiple sites. This virtual environment allows resources to be shared dynamically, when and where required, across a global corporate enterprise.

With the introduction of Session Initiation Protocol ("SIP") based architectures, new features and tighter integration between the turret and telephone exchanges provide enhanced sharing of capabilities. SIP is an application-layer control (i.e., signaling) protocol for creating, modifying, and terminating sessions such as Internet telephony calls with one or more participants and is defined in RFC-3261, "SIP: Session Initiation Protocol," which is incorporated by reference herein in its entirety. SIP has been used in typical IP based networks as the predominant way of signaling between the telephony systems and is used in conjunction with other protocols such as Session Description Protocol (SDP) and Real-Time Protocol (RTP) to provide communications services. While the core SIP specification provides basic session signaling capabilities, it lacks mechanisms that can be leveraged for sharing resources between SIP entities. For instance, SIP lacks support for sharing of line resources across a network of SIP enabled turret/telephony systems.

FIG. 1 shows a traditional, high-level view of interconnecting turret systems in a mesh network topology. As shown in FIG. 1, a mesh network topology is characterized by point-to-point links between network nodes. These links are either circuit-switched or packet-switched. Particularly, communications system 100 includes a turret system 104 having shared lines 102 connected via inter-machine trunk ("IMT") switching fabric 108. A turret device 106 is communicatively coupled to turret system 104 to provide a user interface for the resources provided by communication system 100. A TDM (Time Division Multiplexer) line card (not shown) operates as a gateway to the turret system's switching fabric 108.

Typical mesh networks such as the one depicted in FIG. 1 present certain drawbacks as well. One technical challenge is reducing the complexity of the mesh network topology. Similarly, they are inefficient in their use of network bandwidth and need excessive end-point resources such as line cards (that terminate point-to-point links of the mesh) in the telephony systems. What is needed then, is a topology that reduces the number of cables and resources required to establish a SIP enabled communications network. It would also be useful to prevent loss of visibility of a site in the event a corresponding link fails.

Customers can license a number of resources such as lines on the backbones from several network resource vendors. These licenses can be under different terms from the various vendors, which leads to yet another technical difficulty of enforcing the various corresponding licenses. There is another need, therefore, to provide a way in which to enforce a license for a network resource obtained from network resource providers.

BRIEF DESCRIPTION OF THE INVENTION

The present invention meets the above-identified needs by providing systems, methods, apparatus and computer program products for networking turret systems using SIP. In an example embodiment, systems, methods, apparatus and computer program products are provided for sharing a resource including a subscription engine configured to subscribe to a first turret system to share the resource, a state change engine configured to receive a state change notification corresponding to the resource, from the turret system, and a failover engine configured to invite the turret system to initiate a connection to the resource.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings in which like reference numbers indicate identical or functionally similar elements.

FIG. 4 is an example resource sharing use case for sharing lines between multiple turret systems in accordance with an embodiment of the present invention.

FIGS. 5A-5C are example line traces showing SIP packet messages related to sharing a line resource between three turret systems in accordance with an embodiment of the present invention.

FIG. 6 is a block diagram of two connected turret systems experiencing a mid-dialog failover of a SIP server and failover support in accordance with an embodiment of the present invention.

FIG. 11 is an example line trace showing SIP packet messages related to affiliated license enforcement in accordance with an embodiment of the present invention.

DETAILED DESCRIPTION OF THE INVENTION

Example embodiments of the present invention are now described in more detail herein in terms of a turret communication nodes connected over a star network topology or a cloud network such as an Internet Protocol ("IP") network. This is for convenience only and is not intended to limit the application of the present invention. In fact, after reading the following description, it will be apparent to one skilled in the relevant art(s) how to implement the following invention in alternative embodiments (e.g., strictly private or public systems, or a combination of both).

Figure 1:
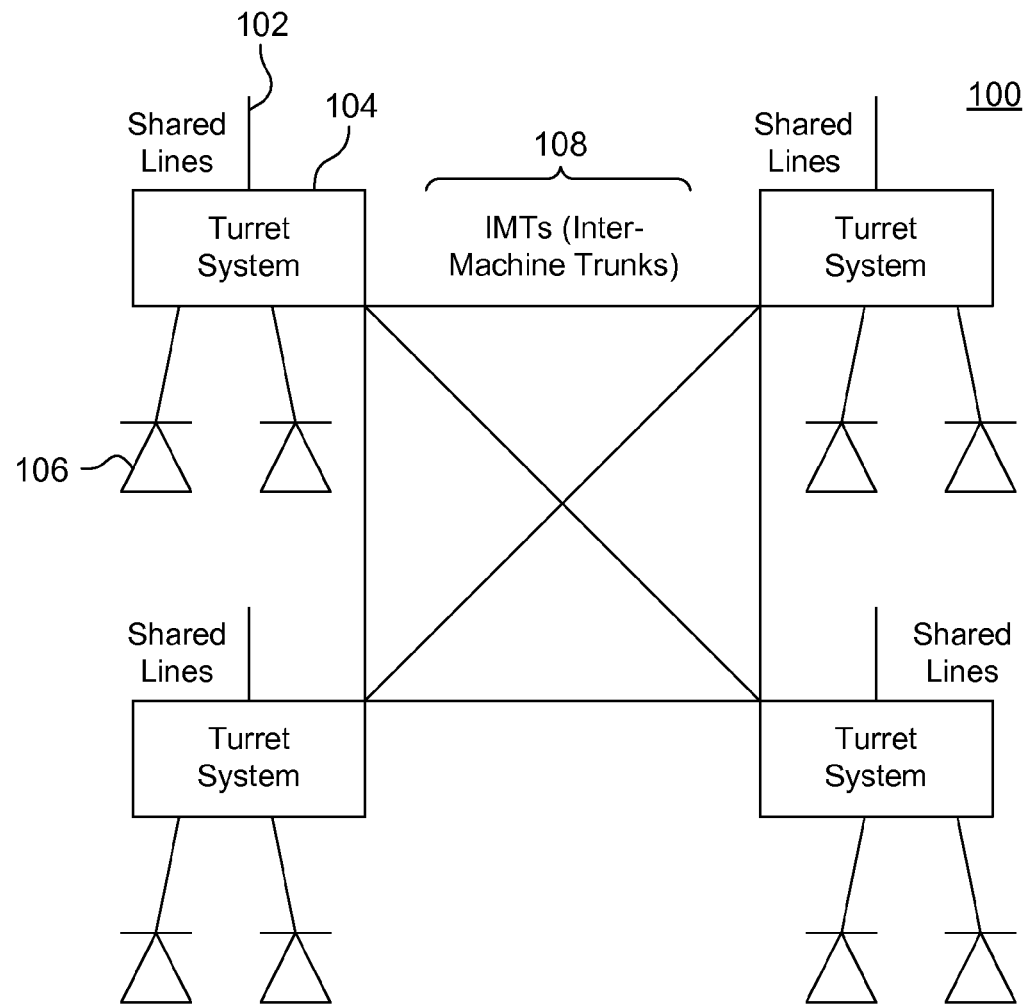
FIG. 1 depicts a block diagram of a prior art mesh network of interconnecting telephony systems.
Figure 2:
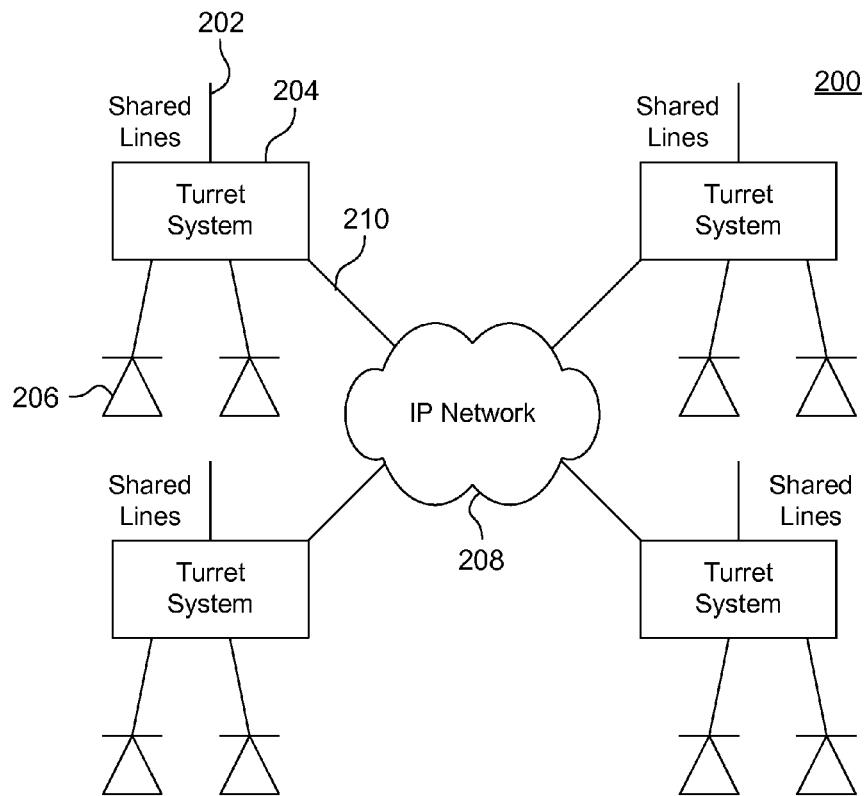
FIG. 2 depicts a block diagram of an example SIP based network in accordance with an embodiment of the present invention.

FIG. 2 depicts an example line sharing architecture 200 having turret systems 204 including turret devices 206 and shared lines 202 in accordance with an embodiment of the present invention. The turret systems 204 are configured as nodes in an IP network 208 and connected via a virtual inter-machine trunk ("IMT") 210.

An event package defines a new SIP body syntax that communicates the state of a shared resource among other parameters between turret systems. The event package is constructed based on the generic SIP events framework defined in RFC 3265, "Session Initiation Protocol (SIP)—Specific Event Notification," which is incorporated herein in its entirety. In the nomenclature of RFC 3265, a turret system that physically hosts a shared resource (e.g., a private line) acts as a "notifier." One or more turret systems that gain access to the shared resource act as a "subscriber."

Figure 3:
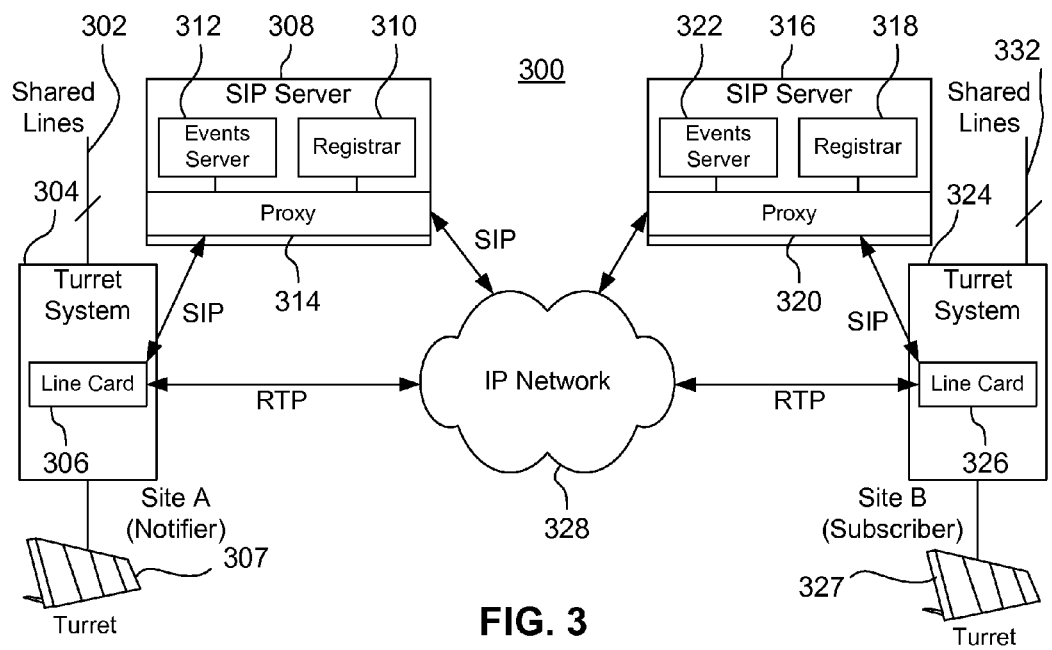
FIG. 3 depicts a block diagram of an example communication system for sharing resources between SIP enabled turret systems in accordance with an embodiment of the present invention.

FIG. 3 depicts a block diagram of an example communication system 300 for sharing resources between SIP enabled turret systems in accordance with an embodiment of the present invention. As shown in FIG. 3, communications system 300 includes two SIP enabled turret systems 304, 324, each having shared lines 302, 332, respectively. Both turret systems are in communication with their respective SIP proxy servers 308, 316. A turret device 307 in communication with turret system 304 provides a user interface for the resources and a SIP line card 306 operates as a SIP gateway to the switching fabric of the turret system. SIP server 308 includes a stateful SIP proxy 314, which together with an events server 312 manages messaging by caching and notifying the states of the resources in communications system 300. SIP server 308 also includes a registrar 310 collocated with proxy 314 for processing and storing SIP registrations.

Similarly, a turret device 327 in communication with turret system 324 provides a user interface for the resources and a SIP line card 326 operates as a SIP gateway to the switching fabric of the turret system. SIP server 316 includes a proxy 320, which together with an events server 322 manages messaging by caching and notifying the states of the resources in communications system 300. SIP server 316 also includes a registrar 318 collocated with proxy 320 for processing and storing SIP registrations.

In an example embodiment, both turret systems 304 and 324 use Real-Time Protocol (RTP) to carry actual voice communications services through the IP network 328. SIP is used by turret systems 304, 324 and SIP servers 308, 316 to provide signaling via the IP network 328 to create, modify, and terminate RTP sessions such as VoIP calls.

The events servers 312, 322 provide a fan-out function which communicates event notifications to multiple turret systems. In addition, events servers 312, 322 can each operate as a subscriber or notifier. Particularly, events servers 312, subscribe to line cards 306, 326, respectively, on behalf of the multiple subscriber systems. Each line card 306, 326, therefore, is not burdened with maintaining multiple subscriptions from multiple subscribers for individual resources. The events servers also handle incoming subscriptions from the remote sites and map them to other subscriptions they have with corresponding line cards. A change in resource state causes a line card (e.g., line card 306) to send a single NOTIFY to a corresponding events server (e.g., events server 312). The events server, in turn, fans out the subscription to all the sites that have subscribed for the state of this resource.

In order to convey resource states from the SIP line card 306 to events server 312 and from events server 312 to any of the entities that have subscribed for the resource, a SIP event-package is defined. An example event-package is specified below:

| Event Package Token Name | = | x-ipc-resource-status |
|---|---|---|
| MIME Type | = | x-ipc-resource-status-info |

These tokens are used in Accept, Event, and Content-Type headers as follows:
In a SUBSCRIBE message:

Accept: application/x-ipc-resource-status-info
Event: x-ipc-resource-status

In a NOTIFY message:
Content-Type: application/x-ipc-resource-status-info

In an example embodiment, the SIP body format for x-ipc-resource-status event package is ASCII text based and includes lines of name-value pairs. Example name-value pairs are described below, where each line contains one name-value pair and are demarcated by a carriage-return (i.e., CR) and line-feed (i.e., LF) sequence. The value of the Accept field in a subscription request indicates the type of message body the source of the request (e.g., turret system 304) can accept. The value of the Event field in a subscription request indicates the SIP event-package that is being subscribed to (e.g., resource status, voicemail, a trader's presence status, etc.).

An "Extn" parameter identifies the extension (or line) resource whose state is being communicated. In an example embodiment, the "Extn" parameter has the following format:
Extn=Numeric string of characters A "status" parameter represents the status of a resource. Exemplary values of the status parameter include: Idle, Busy, Hold, Ring, and Out-of-Service ("OOS"). In an example embodiment, the "status" parameter has the following format:
Status="Idle"|"Busy"|"Hold"|"Ring"|"OOS"

A "CLI" parameter indicates whether the CLI (calling line identification) is being provided in a SIP NOTIFY message. In an example embodiment, the "CLI" parameter has the following format:
CLI="No"|"Yes"

A "CLINum" parameter indicates the phone number of the calling party. In an example embodiment, the "CLINum" parameter has the following format:
CLINum=Numeric string of characters A "CLIName" parameter indicates the name of the calling party. In an example embodiment, the "CLIName" parameter has the following format:
CLIName=Alpha-numeric string of characters The "CallSrc" field indicates whether the call is from an internal or external source. This field is used, for example, to deliver different kinds of rings to the turret users depending on the call source. In an example embodiment, the "CallSrc" parameter has the following format:
CallSrc="Ext"|"Int"

A "CFType" parameter indicates that a call is being forwarded and the reason for call forwarding. The possible values are: None, Immediate ("Imm"), Busy, Invalid ("INV"), Ring No-Answer ("RNA") and Busy Ring No-Answer ("BRNA"). In an example embodiment, the "CFType" parameter has the following format:
CFType="None"|"Imm"|"Busy"|"INV"|"RNA"|"BRNA"

A "CFExt" parameter indicates the extension that a call is forwarded to based on immediate or busy conditions. In an example embodiment, the "CFExt" parameter has the following format:
CFExt=Numeric string of characters A "CFRNAExt" parameter indicates the extension that a call is being forwarded to when the forwarding is due to ring-no-answer. In an example embodiment, the "CFR-NAExt" parameter has the following format:
CFRNAExt=Numeric string of characters FIG. 4 is an example use case 400 for sharing multiple lines between multiple turret systems in accordance with an embodiment of the present invention. For completeness, standard SIP protocol handshaking and authentication communications are shown in FIG. 4, such as a SIP 200 "OK" (i.e., handshaking) message. For simplicity, however, such communications are not discussed in detail below. In this example, two turret systems, subscriber turret system 404 and subscriber turret system 406 share a line with notifier turret system 402. As shown in FIG. 4, subscriber turret system 404 subscribes to a line resource by sending the notifier turret system 402 a SUBSCRIBE message. This message contains an Accept field (not shown) having a value indicating what type of message subscriber turret system 404 expects to receive in return (e.g., NOTIFY message). In this case the returned NOTIFY message indicates that the shared line is idle (i.e., "Line Idle"). After subscriber turret system 404 has created a subscription, another subscriber turret system 406 may subscribe to the same line resource with notifier turret system 402. As with subscriber turret system 404, subscriber turret system 406 sends notifier turret system 402 a SUBSCRIBE message and waits for a NOTIFY message in return. Such signaling can be in any order or can occur simultaneously. As shown in FIG. 4, notifier turret system 402 responds to subscriber turret system with the expected NOTIFY message: The NOTIFY message indicates the line is still idle (i.e., "Line Idle").

After subscription with notifier turret system 402 has completed, if a line is made busy by the notifier turret system 402, then it will send a NOTIFY message to both the subscriber turret system 404 and subscriber turret system 406, indicating that the line is busy (i.e., "Line Busy"). If a user connected to subscriber turret system 404 makes the line busy (e.g., seizes an idle shared line), subscriber turret system 404 issues an INVITE to the notifier turret system 402. The INVITE establishes an actual voice path session between the user at subscriber turret system 404 and the shared line connected to notifier turret system 402. The state of the shared line has now changed from idle to busy. In order to communicate this state change to the other subscriber systems, notifier turret system 402 issues a NOTIFY (Busy) to subscriber turret systems 404 and 406. Subscriber turret systems 404 and 406 will indicate to their respective users that the line is busy, for example, by turning on a line busy indicator on a turret device (not shown).

FIGS. 5A-5C are example line traces showing SIP packet messages related to sharing a line resource between multiple turret systems. Traces 502, 504, 506, 510, 512 and 514 include standard SIP headers using the SIP definitions described above. As shown in FIG. 5A a subscriber turret system (e.g., FIG. 4, 404) initially establishes a subscription context with a notifier turret system (e.g., FIG. 4, 402). In return, notifier turret system 402 responds with a standard SIP acknowledgement message (e.g., "200 OK"), as shown in line traces 504.

Following the SIP 200 acknowledgment message is an immediate NOTIFY message with the current status of the shared resource from notifier turret system 402, as shown in FIG. 5B. Particularly, as shown by line traces 508, extension 201401145 (i.e., "Extn=201401145") initially sends a NOTIFY message indicating that it has a status of idle (i.e., "Status=Idle"), the CLI parameter indicates that the CLI (calling line identification) is not being provided in a SIP NOTIFY message (i.e., "CLI=No"), and the CallSrc parameter indicates that the extension is external (i.e., "CallSrc=EXT"). A SIP 200 acknowledgement message from the subscriber turret system (e.g., FIG. 4, 404) completes the SIP NOTIFY transaction.

Referring now to FIG. 5C, if a turret user on the notifier turret system (e.g., FIG. 4, 402) seizes a line, thus making it busy, the notifier turret system will send a NOTIFY to the subscriber turret systems (e.g., FIG. 4, 404 and 406) to indicate a change in the resource status, as shown in line traces 512. Particularly, the change of state causes a NOTIFY packet to be propagated throughout the system (i.e., via the notifier turret system 402 to notify the other endpoints sharing this line that the line is busy by changing the value of the status parameter to represent a busy state (i.e., "Status=Busy"). Because this is an outgoing call, the CLI parameter indicates that the CLI (calling line identification) is not being provided in a SIP NOTIFY message (i.e., "CLI=No"), and the CallSrc parameter indicates that the extension is external. A subscribing turret system (e.g., FIG. 4, 404) acknowledges with a standard SIP 200 OK message, as shown in line traces 514. While the example line traces depicted in FIGS. 5A-5C show communications between a notifier turret system (e.g., FIG. 4, 402) and only one subscriber system (e.g., FIG. 4, 404), it should be understood that several additional subscriber systems may subscribe to a shared resource and receive and transmit the same type of messages described above with respect to FIGS. 5A-5C.

FIG. 6 is a block diagram of two connected turret systems experiencing a mid-dialog SIP proxy failover and failover support in accordance with an example embodiment of the present invention. System 600 includes two turret systems 602, 612 having line cards 604 and 614 and in communication through SIP servers 606 and 610, respectively. SIP servers 606, 608 and 610 include an agent context to communicate with an events server and a proxy (not shown), which together manage messaging by caching the states of the resources in communications system 600.

In the SIP server 606 fails during an active call, SIP server 608 establishes a connection to recover from the failed server. Particularly, a line card 604 detects a failed proxy and migrates the active call from the failed SIP server 606 to a backup SIP server 608 which takes over the call. The migration is substantially, if not completely, seamless from the perspective of a user because the migration does not impact voice communications.

Figure 7:
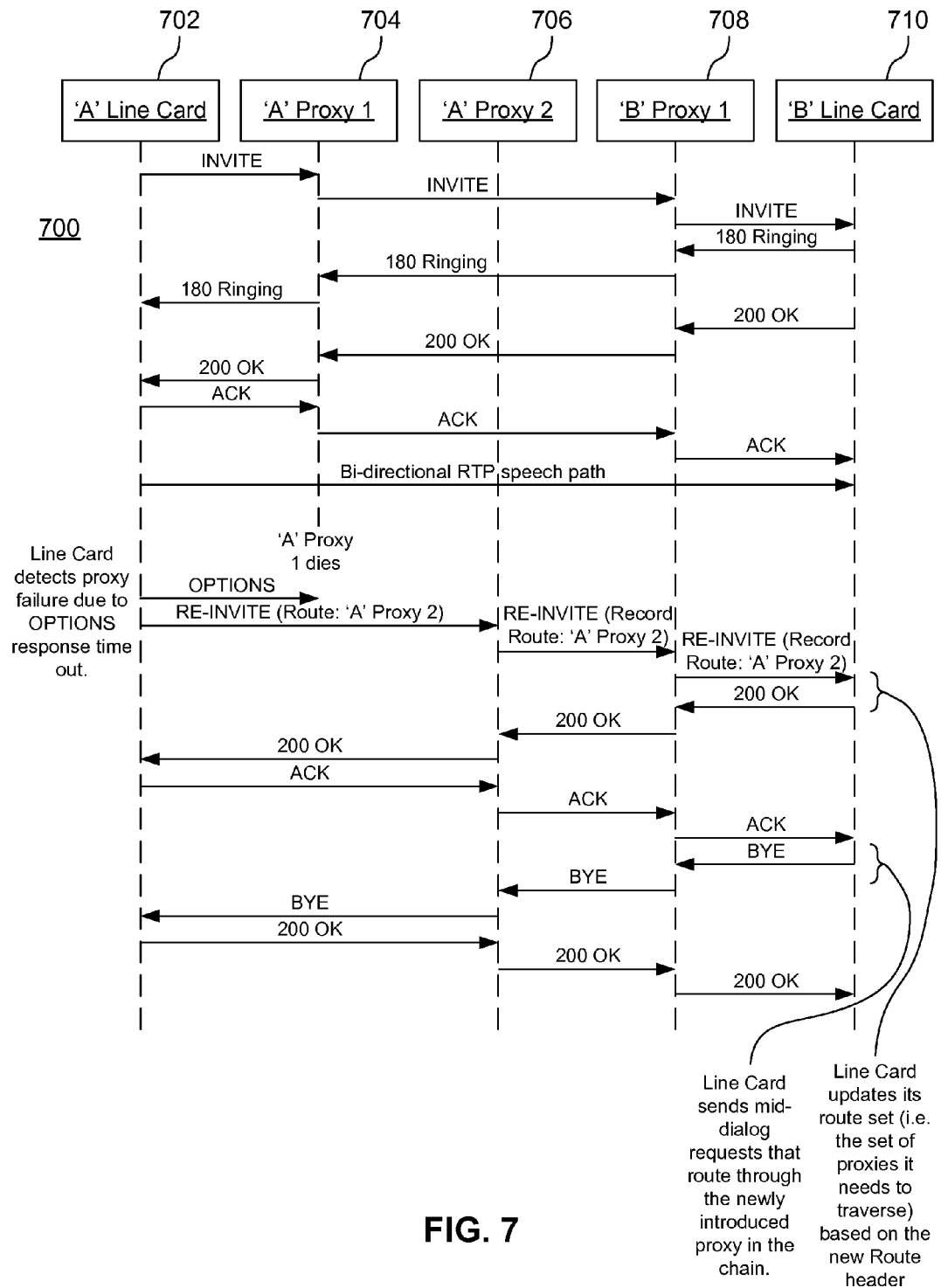
FIG. 7 depicts an example use case showing failover support for a mid-dialog proxy failover in accordance with an embodiment of the present invention.

FIG. 7 depicts an example use case showing SIP server failover in the middle of a call in accordance with an example embodiment of the present invention. Initially, a turret system line card 702 calls another turret system. As shown in the example, 'A' line card 702 sends, via its primary proxy 704 ('A' Proxy 1), an INVITE message to the primary proxy 708 ('B' Proxy 1") for 'B' line card 710. In response, 'B' line card 710 returns a Ringing message (i.e., a SIP 180 "Ringing Message") via 'B' Proxy 1, which in turn sends the message to 'A' Proxy 1. 'A' Proxy 1 forwards the Ringing message to 'A' line card 702, causing it to provide a user with a ringing indication. Should the call succeed, a bidirectional RTP speech path is initiated and the call is connected. As explained above, standard SIP acknowledgment messages are shown in FIG. 7 for completeness.

As shown in FIG. 7, 'A' Proxy 1 (704) has failed. Prior to the failure, 'A' line card 702 expected to receive within a predetermined time an acknowledgement to a SIP OPTIONS message it has sent. This periodic OPTIONS/200 message exchange serves as a keep-alive mechanism. If the SIP OPTIONS response message is not received, 'A' line card 702 detects the failure, and processes the OPTIONS response timeout. Particularly, 'A' line card 702 sends a SIP UPDATE or RE-INVITE message (a RE-INVITE message is an INVITE message that occurs within an established dialog), but this time, via its secondary proxy, 'A' Proxy 2 (706), which in turn communicates the UPDATE or RE-INVITE message to 'B' Proxy 1 (708), which forwards the message to 'B' line card 710. The UPDATE or RE-INVITE message contains an indication that the return route should be through 'A' Proxy 2 (706), as shown in FIG. 7. Particularly, the routing information including the new return path is stored in a Record-Route header.

'B' line card 710 updates its route set (i.e., the set of proxies it needs to traverse the communications network) based on the new Record-Route header in the RE-INVITE message and sends a standard SIP 200 OK message, receives an ACK response and routes any mid-dialogue requests through the newly introduced proxy in the chain, as shown in FIG. 7 (e.g., BYE message). Going forward, 'A' line card 702 will send acknowledgement messages or other SIP messages to 'B' line card 710, through 'A' Proxy 2 (706) and 'B' Proxy 1 (708).

Figure 8:
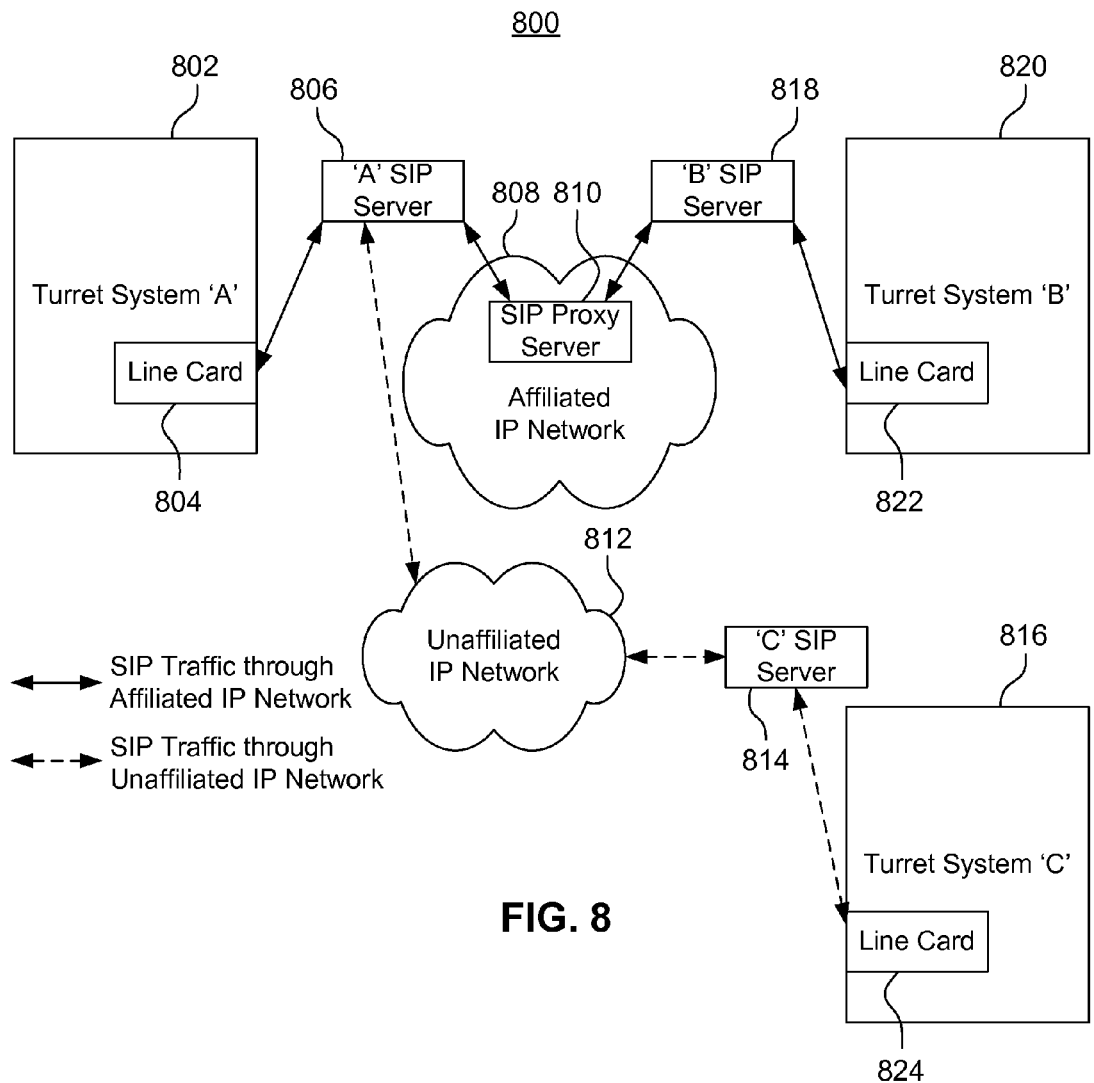
FIG. 8 depicts a block diagram showing interconnection of turret systems over affiliated versus unaffiliated networks in accordance with an embodiment of the present invention.

FIG. 8 depicts a block diagram 800 showing example interconnections of turret systems over affiliated versus unaffiliated networks in accordance with an example embodiment of the present invention. Generally, customers license a predetermined number of resources such as lines on the network backbones of several vendors. Lines can therefore be licensed under different terms from the various vendors.

As shown in FIG. 8, a turret system 802 having a line card 804 is connected to a SIP server 806 ('A' SIP server) which is connected to both an affiliated IP network 808 having a SIP proxy server 810 and an unaffiliated IP network 812. The affiliated IP network 808 is also connected to with another SIP server 818 (i.e., 'B' SIP server), which in turn, is connected to another turret system 820 through its line card 822. The unaffiliated IP network 812 also is connected to a SIP server 814 (i.e., 'C' SIP server) which is in communication with a turret system 816 through its line card 824.

A secret handshake in accordance with an example aspect of the present invention enforces what is referred to as an affiliated license. An affiliated license is a category of license for SIP calls that traverse through an IP network of a particular vendor. In this example case, a vendor licenses affiliated IP network 808. The technical problem being solved is the establishment of a secure, secret handshake between two SIP entities (e.g., through turret system 802 and SIP proxy server 810) to enable certain licensing schemes (such as the affiliated license scheme) and application services in the network core. The secret handshake allows either entity to offer the other entity a more privileged treatment or a profile based treatment. This is accomplished by extending the SIP protocol.

Figure 9:
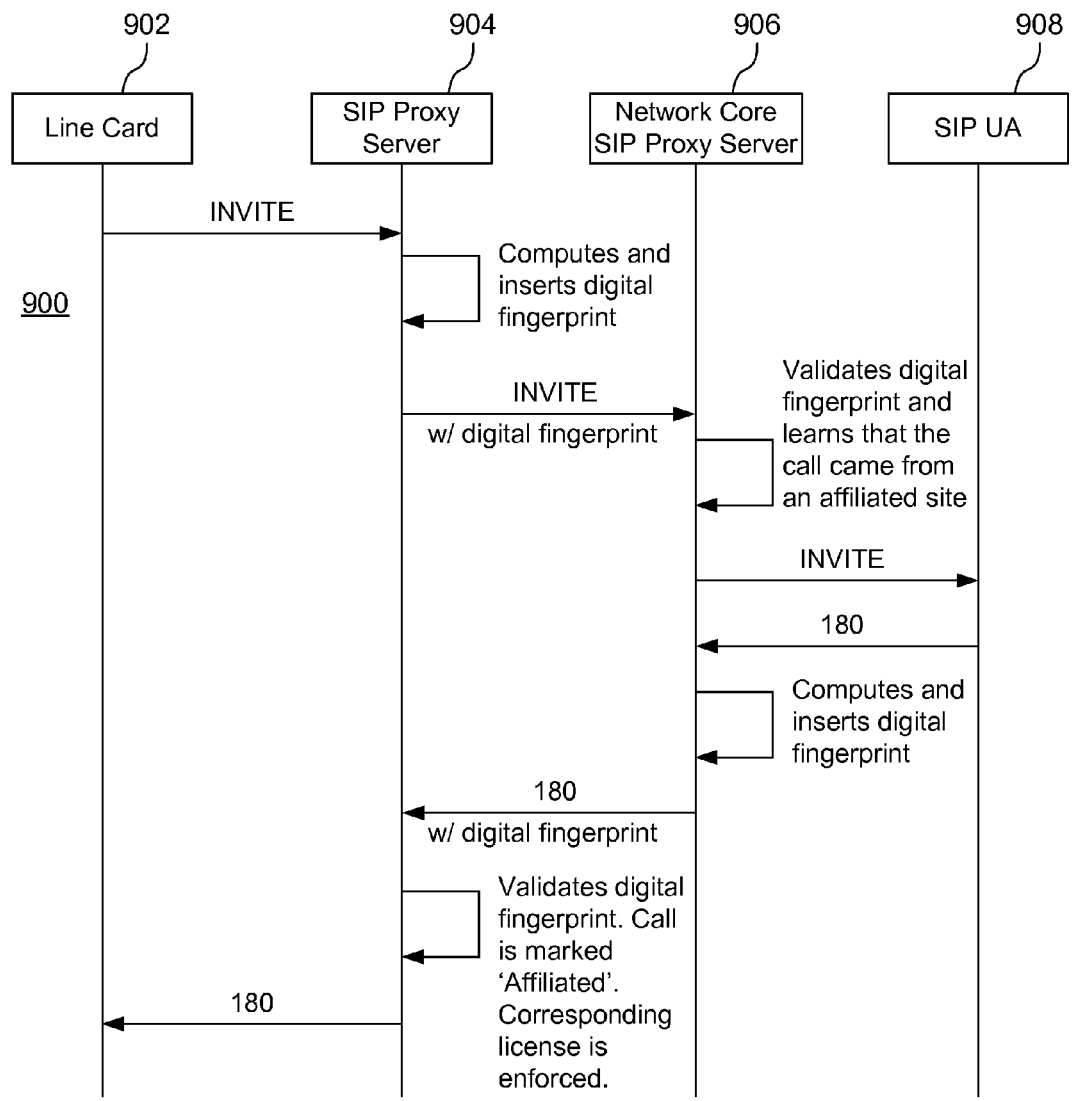
FIG. 9 depicts an example line sharing use case for performing affiliated license enforcement for outbound SIP calls in accordance with an embodiment of the present invention.

FIG. 9 depicts an example private line use case 900 for performing affiliated license enforcement for outbound SIP calls in accordance with an embodiment of the present invention. The secret-handshake mechanism is based on hashing of certain SIP headers fields of a SIP message and then carrying the resultant hash value in the same SIP message. A hash function is a reproducible method of turning some kind of data into a (relatively) small number that may serve as a digital "fingerprint" of the data. The algorithm transposes the data to create such fingerprints, called hash values. The strength of the hashing algorithm is a design choice. In one embodiment a strong randomizing, cryptographic algorithm such as MD5 for hash computation can be used. In another embodiment, a relatively light-weight hashing function can be used.

Referring to FIG. 9, in an example embodiment, both SIP proxy servers 904 and 906 are aware of the hashing algorithm that will be used and the relevant partial information in a SIP message that will be hashed. For outbound SIP calls, SIP proxy server 904 hashes certain header fields in a SIP INVITE message and places the resultant digital fingerprint in a "Via" branch after the RFC 3261 magic cookie. The proxy server in network core SIP proxy server 906 independently computes the hash based on the same header fields and then compares it with the string segment between the hyphens in the "Via" branch parameter. If the two (i.e., the digital fingerprint sent by SIP proxy server 904 and the one computed by network core proxy server 906) match, then the network core proxy server 906 will mark the call as having arrived from an affiliated site. This information will be later used to decide if an outbound response message should contain the digital fingerprint. When the network core proxy server 906 receives an end-to-end provisional response (such as a SIP 180 or 183 message) from a remote SIP user agent 908, it will lookup the call context and if the call had been marked as an affiliated call. If it has, then the network core proxy server 906 computes the hash of the "Contact" header field and places it in its "Record-Route" header as a header parameter associated with the affiliated SIP proxy server 904. This parameter is called x-ipc-id. In this example, x-ipc-id=84 d860e 103f2ae19b32fc1f6942a8bc8.

Figure 10:
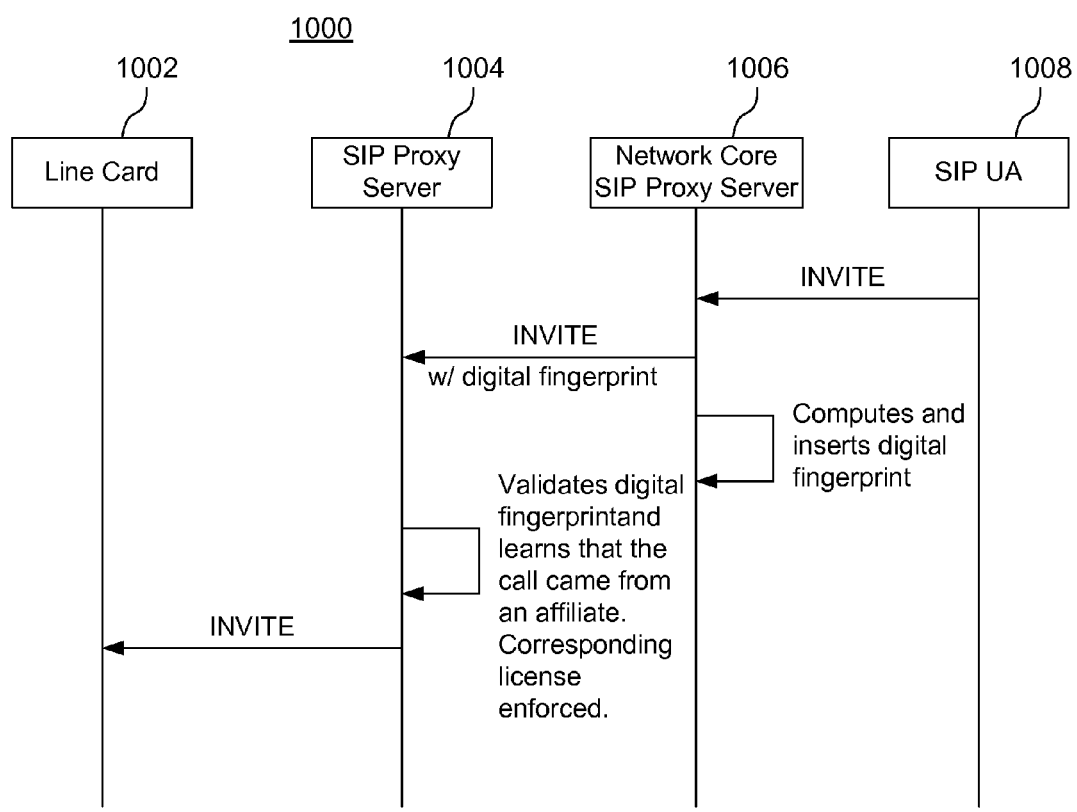
FIG. 10 depicts an example line sharing use case for performing affiliated license enforcement for inbound SIP calls in accordance with an embodiment of the present invention.

FIG. 10 depicts an example line sharing use case 1000 for performing affiliated license enforcement for inbound SIP calls in accordance with an embodiment of the present invention. The network core proxy server 1006 inserts the digital fingerprint in the 'Via' branch parameter and transmits the INVITE message to SIP proxy server 1004. The SIP proxy server 1004 computes the hash and compares it with what it received. If the two match then the call will be deemed an affiliated call and processed as such. As shown in FIG. 10, SIP proxy server 1004 communicates an INVITE message to line card 1002 for appropriate treatment.

Sharing resources renders turret systems as a single virtual telephony system, where the users of the individual systems can access resources available across the networked systems without knowing where the resources actually reside. Example systems 200, 300, 600 and 800 are not limited to sharing line resources as described above. Other resources, such as conference mixers, tones and announcements playback servers, recorders can be implemented into such communication systems using the techniques described herein.

FIG. 11 is an example line trace 1100 showing SIP packet messages related to affiliated license enforcement in accordance with an example embodiment of the present invention. Traces 1102, 1104 and 1106 include standard SIP headers. As described above, however, a secret handshake mechanism is incorporated into the SIP headers. As shown in line traces 1102, a SIP line card (e.g., FIG. 9, 902) transmits an INVITE message to a SIP proxy server (e.g., FIG. 9, 904). In turn, SIP proxy server computes and inserts a digital fingerprint as discussed above with respect to FIG. 9, and inserts the fingerprint into the "VIA" branch field of the header, as shown in line traces 1104 (i.e., x-ipc-id: 84d860e 103f2ae19b32fc1f6942a8bc8). SIP proxy server 1004 transmits the INVITE message to a network core proxy server (e.g., FIG. 9, 906).

As shown in line traces 1106, should a network core proxy server receive a SIP 180 message containing a "ringing" indication, it too computes and inserts a digital fingerprint and forwards the 180 message with the digital fingerprint to the designated SIP proxy server (e.g., FIG. 9, 904) in the "Record-Route" SIP header (i.e., x-ipc-id: 84d860e103f2ae19b32fc1f6942a8bc8).

Figure 12:
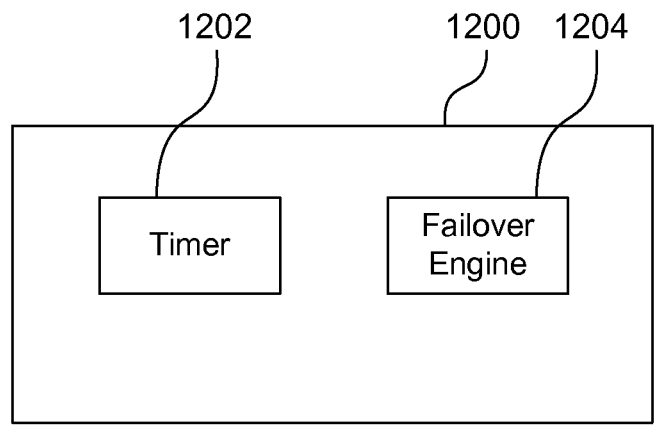
FIG. 12 is an example collaboration diagram of functional modules deployed on a computer system for responding to a mid-dialog SIP proxy server failure in accordance with an embodiment of the present invention.

FIG. 12 is an example collaboration diagram of functional modules deployed on a computer system for responding to a SIP proxy mid-dialog failure in accordance with an embodiment of the present invention. With reference to FIGS. 2, 6, and 7, a device 1200 includes a timer 1202 and a failover engine 1204. Device 1200 can be a line card, such as the line cards 306 (FIG. 3), 604 (FIG. 6) and 702 (FIG. 7) and can include other modules such a receiver, transmitter, packet generator, and the like, which are not shown. Alternatively, device 1200 can be a separate device communicatively coupled to line cards 306 (FIG. 3), 604 (FIG. 6) and 702 (FIG. 7). In either configuration, the functional modules of device 1200 are used to detect and handle a mid-dialog SIP proxy failure.

Device 1200 provides timer 1202 to keep track of the time it takes a SIP response message to be received and to signal a timeout if the SIP response message has not been received within a predetermined amount of time. Should the SIP response message not be received within the predetermined amount of time, the timer generates a timeout signal which causes a failover engine to send a SIP UPDATE or RE-INVITE request to a backup (or secondary) SIP server as described above with respect to FIGS. 6 and 7.

Figure 13:
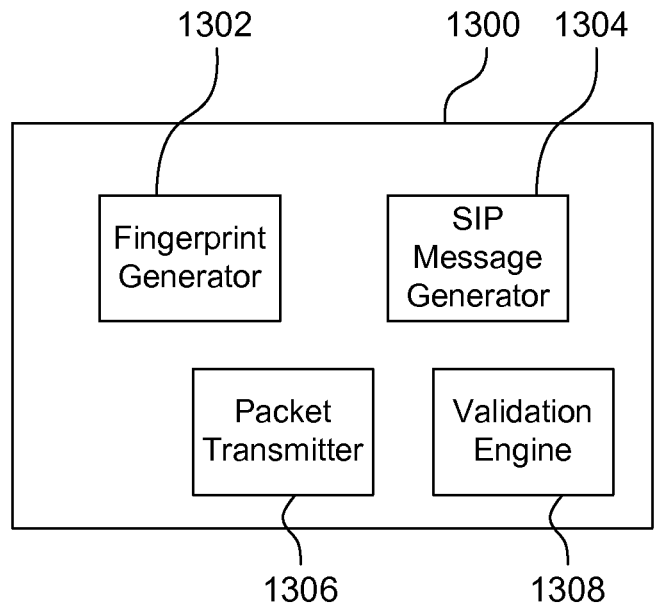
FIG. 13 is an example collaboration diagram of functional modules deployed on a computer system for enforcing a license to a resource in accordance with an embodiment of the present invention.

FIG. 13 is an example collaboration diagram of functional modules deployed on a computer system for enforcing a license to a resource in accordance with an embodiment of the present invention. Device 1300 includes a fingerprint generator 1302, a SIP message generator 1304, a packet generator 1306 and a validation engine 1308. Device 1300 can be a line card, such as the line cards 804 (FIG. 3) and 902 (FIG. 9) and can include other modules such a receiver and transmitter, and the like, which are not shown. Alternatively, device 1300 can be a separate device communicatively coupled to line cards 804 (FIG. 3) and 902 (FIG. 9). Device 1300 can alternatively be a component within or communicatively coupled to a SIP proxy server such as SIP proxy servers 810 (FIG. 8), 904 and 906 (FIG. 9). In either configuration, the functional modules of device 1300 are used to enforce a license to a resource.

Referring to FIGS. 9 and 10 above, device 1300 uses the SIP message generator to generate a SIP message such as an INVITE message. Before transmitting the INVITE message fingerprint generator 1302 computes a fingerprint based on particular fields of the SIP message and inserts the fingerprint back into the SIP message, for example in the "Via" and/or "Record-Route" header of the SIP message, as described above with respect to FIGS. 8-11. The packet transmitter 1306, in turn, forwards the SIP message with the fingerprint to another SIP proxy server such as SIP proxy server 904 (FIG. 9) or Network core SIP proxy server 906 (FIG. 9).

Upon receipt of a SIP message, validation engine 1308 detects whether the message includes a fingerprint, validates the fingerprint and identifies the particular message as being from an affiliated entity if warranted. As shown for example in FIG. 9, if the fingerprint is validated, then a call is marked "Affiliated" indicating that the call is from an affiliate SIP entity. Alternatively, validation engine 1308 deducts a different (unaffiliated) license or rejects the message and signals a management system of the network (note shown) to take necessary action (i.e., drop the call, trace the call, send a message to the sender, to name a few).

The example embodiments of the invention (i.e., systems 200, 300, 600 and 800; processes 200, 400, 700, 900 and 1000, devices 1200 and 1300 or any part(s) or function(s) thereof) may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary, in any of the operations described herein. Rather, the operations may be completely implemented with machine operations. Useful machines for performing the operation of the example embodiments presented herein include general-purpose digital computers or similar devices.

From a hardware standpoint, a computer system typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a computer system typically includes software resident on a storage media (e.g., a disk drive or memory card), which, when executed, directs the computer system in performing transmission and reception functions. The computer system software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, computer systems can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

Software embodiments of the example embodiments presented herein may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-13 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the processes recited in the claims need not be performed in the order presented.

What is claimed:

1. A Session Initiation Protocol (SIP) user agent for sharing a resource, comprising:
    a subscription engine associated with a first turret system and configured to subscribe to a second turret system to share a resource associated with the second turret system;
    a state change engine associated with the first turret system and configured to receive a state change notification corresponding to the resource, from the second turret system; and
    a failover engine configured to:
        upon detection of a mid-dialog Session Initiation Protocol (SIP) proxy failure, generate either a SIP RE-INVITE message or a SIP UPDATE message, the SIP RE-INVITE message or the SIP UPDATE message including routing information for a new communication path between the first turret system and the second turret system, and
        communicate either the SIP RE-INVITE message or the SIP UPDATE message to either the first turret system or the second turret system to invite the first turret system or the second turret system, respectively, to initiate a connection to the resource via the new communication path.

2. The SIP user agent of claim 1, wherein at least one of the SIP user agents is configured to validate the state change notification.

3. The SIP user agent of claim 1, wherein the resource is at least one of a telephone resource, a fax resource, a voicemail system resource, a speakerphone resource, a push-to-talk resource, a video resource, or a data communications resource.

4. The SIP user agent of claim 1, further comprising:
    a timer configured to detect a SIP keep alive timeout, wherein the failover engine is further configured to transmit either the SIP RE-INVITE message or the SIP UPDATE message to a backup proxy configured to request a line card to update routing information.

5. The SIP user agent of claim 1, further comprising:
    a SIP message generator configured to generate a second SIP message;
    a fingerprint generator configured to generate a fingerprint based on at least one field of the second SIP message; and
    a packet transmitter configured to transmit the second SIP message over a SIP proxy server configured to validate the fingerprint and detect based on the fingerprint that a source of the second SIP message is affiliated with the license.

6. A method for sharing a resource, comprising:
    subscribing, by a first turret system, to a second turret system to share a resource associated with the second turret system;
    receiving a state change notification corresponding to the resource, from the second turret system;
    upon detection of a mid-dialog Session Initiation Protocol (SIP) proxy failure, generating, by a SIP user agent, either a SIP RE-INVITE message or a SIP UPDATE message, the SIP RE-INVITE message or the SIP UPDATE message including routing information for a new communication path between the first turret system and the second turret system; and
    communicating, by the SIP user agent, either the SIP RE-INVITE message or the SIP UPDATE message to either the first turret system or the second turret system to invite the first turret system or the second turret system, respectively, to initiate a connection to the resource via the new communication path.

7. The method of claim 6, further comprising:
validating the state change notification.

8. The method of claim 6, further comprising:
detecting a SIP keep alive timeout; and
transmitting either the SIP RE-INVITE message or the SIP UPDATE message to a backup proxy configured to request a line card to update routing information.

9. The method of claim 6, further comprising:
generating a second SIP message;
generating a fingerprint based on at least one field of the second SIP message; and
transmitting the second SIP message over a SIP proxy server configured to validate the fingerprint and detect based on the fingerprint that a source of the second SIP message is affiliated with the license.

10. The method of claim 6, wherein the resource is at least one of a telephone resource, a fax resource, a voicemail system resource, a speakerphone resource, a push-to-talk resource, a video resource, or a data communications resource.

11. A non-transitory computer-readable medium having stored thereon sequences of instructions, the sequences of instructions including instructions which, when executed by a computer system, cause the computer system to perform:
subscribing, by a first turret system, to a second turret system to share a resource associated with the second turret system;
receiving a state change notification corresponding to the resource, from the second turret system;
upon detection of a mid-dialog Session Initiation Protocol (SIP) proxy failure, generating, by a SIP user agent, either a SIP RE-INVITE message or a SIP UPDATE message, the SIP RE-INVITE message or the SIP UPDATE message including routing information for a new communication path between the first turret system and the second turret system; and
communicating, by the SIP user agent, either the SIP RE-INVITE message or the SIP UPDATE message to either the first turret system or the second turret system to invite the first turret system or the second turret system, respectively, to initiate a connection to the resource via the new communication path.

12. The non-transitory computer-readable medium according to claim 11, wherein the sequences of instructions further include instructions which, when executed by the computer system, cause the computer system to perform:
validating the state change notification.

13. The non-transitory computer-readable medium according to claim 11, wherein the sequences of instructions further include instructions which, when executed by the computer system, cause the computer system to perform:
detecting a SIP keep alive timeout; and
transmitting either the SIP RE-INVITE message or the SIP UPDATE message to a backup proxy configured to request a line card to update routing information.

14. The non-transitory computer-readable medium according to claim 11, wherein the sequences of instructions further include instructions which, when executed by the computer system, cause the computer system to perform:
generating a second SIP message;
generating a fingerprint based on at least one field of the second SIP message;
transmitting the second SIP message over a SIP proxy server configured to validate the fingerprint; and
detecting based on the fingerprint that a source of the second SIP message is affiliated with the license.

15. The non-transitory computer-readable medium of claim 11, wherein the resource is at least one of a telephone resource, a fax resource, a voicemail system resource, a speakerphone resource, a push-to-talk resource, a video resource, or a data communications resource.

16. A system for sharing a resource, comprising:
means for subscribing, by a first turret system, to a second turret system to share a resource associated with the second turret system;
means for receiving a state change notification corresponding to the resource, from the second turret system;
means for, upon detection of a mid-dialog Session Initiation Protocol (SIP) proxy failure, generating, by a SIP user agent, either a SIP RE-INVITE message or a SIP UPDATE message, the SIP RE-INVITE message or the SIP UPDATE message including routing information for a new communication path between the first turret system and the second turret system; and
means for communicating, by the SIP user agent, either the SIP RE-INVITE message or the SIP UPDATE message to the first turret system or the second turret system to invite the first turret system or the second turret system, respectively, to initiate a connection to the resource via the new communication path.

17. The system of claim 16, further comprising:
means for validating the state change notification.

18. The system of claim 16, further comprising:
means for detecting a SIP keep alive timeout; and
means for transmitting either the SIP RE-INVITE message or the SIP UPDATE message to a backup proxy configured to request a line card to update routing information.

19. The system of claim 16, further comprising:
means for generating a second SIP message;
means for generating a fingerprint based on at least one field of the second SIP message;
means for transmitting the second SIP message over a SIP proxy server configured to validate the fingerprint; and
means for detecting based on the fingerprint that a source of the second SIP message is affiliated with the license.

20. The system of claim 16, wherein the resource is at least one of a telephone resource, a fax resource, a voicemail system resource, a speakerphone resource, a push-to-talk resource, a video resource, or a data communications resource.

* * * * *

UNITED STATES PATENT AND TRADEMARK OFFICE
CERTIFICATE OF CORRECTION

PATENT NO. : 8,570,853 B2  Page 1 of 1
APPLICATION NO. : 12/172545
DATED : October 29, 2013
INVENTOR(S) : Aseem Bakshi et al.

It is certified that error appears in the above-identified patent and that said Letters Patent is hereby corrected as shown below:

IN THE SPECIFICATION:

COLUMN 4:

Line 25, "312," should read --312, 322--.

COLUMN 9:

Line 1, "x-ipc-id=84    d860e" should read --x-ipc-id=84d860e--.

Signed and Sealed this
Twenty-third Day of December, 2014

Michelle K. Lee
*Deputy Director of the United States Patent and Trademark Office*